T. B. FITE & Y. B. FRENCH.
SELF DUMPING SHOVEL.
APPLICATION FILED MAY 1, 1915.
1,176,531. Patented Mar. 21, 1916.
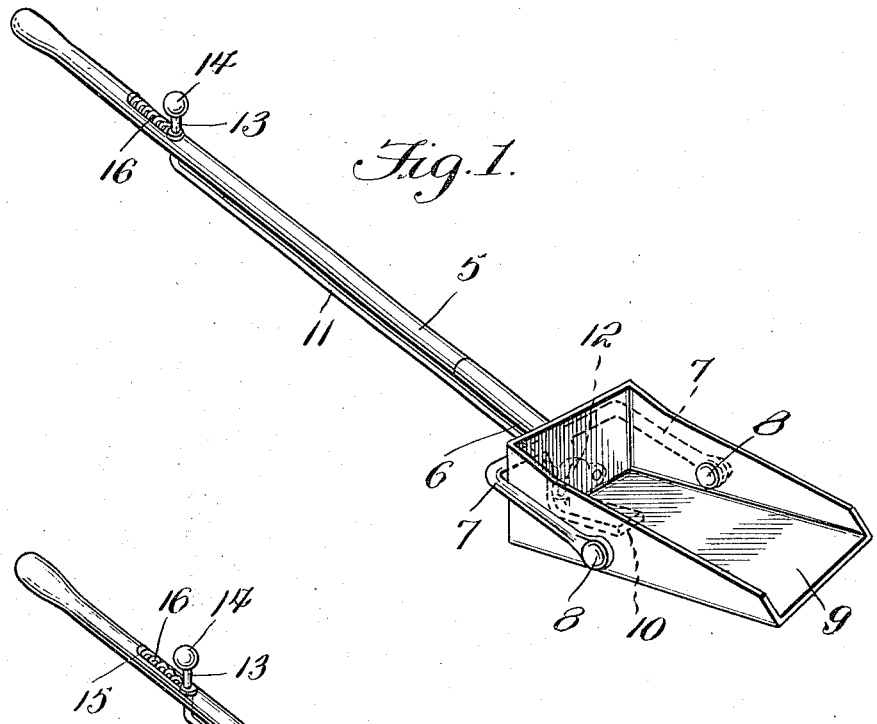
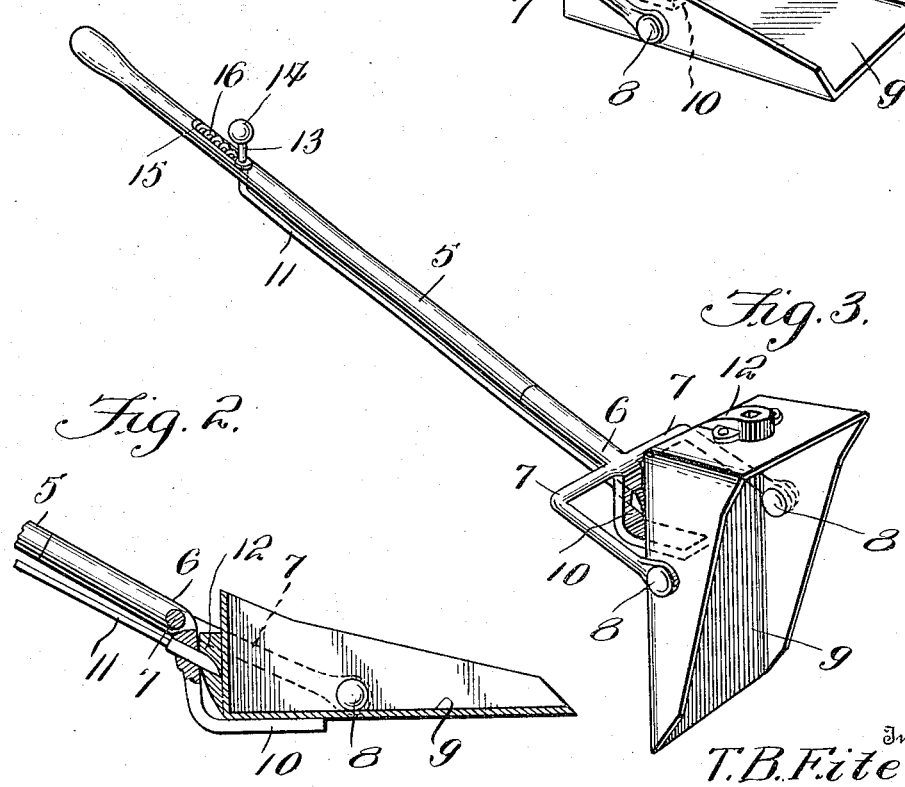
Inventors
T. B. Fite
Y. B. French
By Victor J. Evans
Attorney

UNITED STATES PATENT OFFICE.

THOMAS B. FITE AND YANCEY B. FRENCH, OF CARTER, KENTUCKY.

SELF-DUMPING SHOVEL.

1,176,531.

Specification of Letters Patent. Patented Mar. 21, 1916.

Application filed May 1, 1915. Serial No. 25,234.

*To all whom it may concern:*

Be it known that we, THOMAS B. FITE and YANCEY B. FRENCH, citizens of the United States, residing at Carter, in the county of Carter and State of Kentucky, have invented new and useful Improvements in Self-Dumping Shovels, of which the following is a specification.

The invention relates to a shovel, and more particularly to the class of self-dumping shovels.

The primary object of the invention is the provision of a shovel of this character wherein the user of the same is relieved from the dumping of its load after the filling thereof, the blade of the shovel being locked in a novel manner so as to avoid accidental dumping when the shovel is in use, yet the said blade can be conveniently released for the dumping of its contents.

Another object of the invention is the provision of a shovel of this character which is extremely simple in construction, reliable and efficient in its purpose, strong, durable, and inexpensive in manufacture.

Other objects will be in part obvious and in part hereinafter pointed out.

The invention accordingly consists in the features of construction, combination of elements, and arrangement of parts which will be exemplified in the construction hereinafter set forth, and the scope of the application of which will be indicated in the following claims.

In the drawing:—Figure 1 is a perspective view of a shovel constructed in accordance with the invention. Fig. 2 is a fragmentary longitudinal sectional view thereof. Fig. 3 is a perspective view showing the shovel in dumping position.

Similar reference characters indicate corresponding parts throughout the several views in the drawing.

Referring to the drawing in detail, the shovel comprises a handle 5, preferably made from hard wood, although it may be made from other material, and of any desirable length to suit the fancy of the user. Mounted on one end of the handle 5 is a fork 6, preferably made from metal, having offset limbs 7 through which are passed pivots 8 swingingly connecting the scoop-shaped shovel blade 9 thereto so that it may gravitate to dumping position.

Integrally formed centrally of the fork 6 is a substantially L-shaped leg 10 which forms a bearing for the shovel blade 9 when in non-dumping position so as to relieve the strain upon the pivots 8 connecting the fork to the said blade.

Slidably connected and coextensive with a greater portion of the length of the handle 5 is a locking rod 11, the inner end of which is adapted to engage in a socket 12 formed in the heel end of the shovel blade 9 so as to lock the same against dumping movement, the outer end of the rod 11 being upwardly bent to form a hand grip 13 terminating in a knob 14, and this grip extends through an elongated slot 15 formed in the handle and is acted upon by a coiled tension spring 16 suitably held in the said slot to hold the rod 11 normally in locking position relative to the shovel blade 9, the knob 14 of the grip 13 being in convenient reach of the operator or user of the shovel so that when the blade 9 is filled its load can be readily dumped.

From the foregoing description, taken in connection with the accompanying drawing, the construction and manner of operation of the device will be clearly understood, and therefore a more extended explanation has been omitted.

What is claimed is:—

1. A shovel comprising a handle, a fork carried thereby, a scoop-shaped blade pivotally mounted in the fork, a rest leg formed centrally of the fork for the said blade, and means carried by the handle and engageable with the heel of the blade for locking it normally against swinging movement.

2. A shovel comprising a handle, a fork carried thereby, a scoop-shaped blade pivotally mounted in the fork, a rest leg formed centrally of the fork for the said blade, a locking rod slidably connected with the handle and engageable with the heel of the blade to lock the same against swinging movement, and a spring acting upon the rod to hold the same in normal locking position.

In testimony whereof we affix our signatures in presence of two witnesses.

THOMAS B. FITE.
YANCEY B. FRENCH.

Witnesses:
DELLA RATCLIFF,
MALINDA MCGLOUE.

Copies of this patent may be obtained for five cents each, by addressing the "Commissioner of Patents, Washington, D. C."